(No Model.)
J. O. BEEK.
CULTIVATOR SHOVEL.
No. 349,334. Patented Sept. 21, 1886.
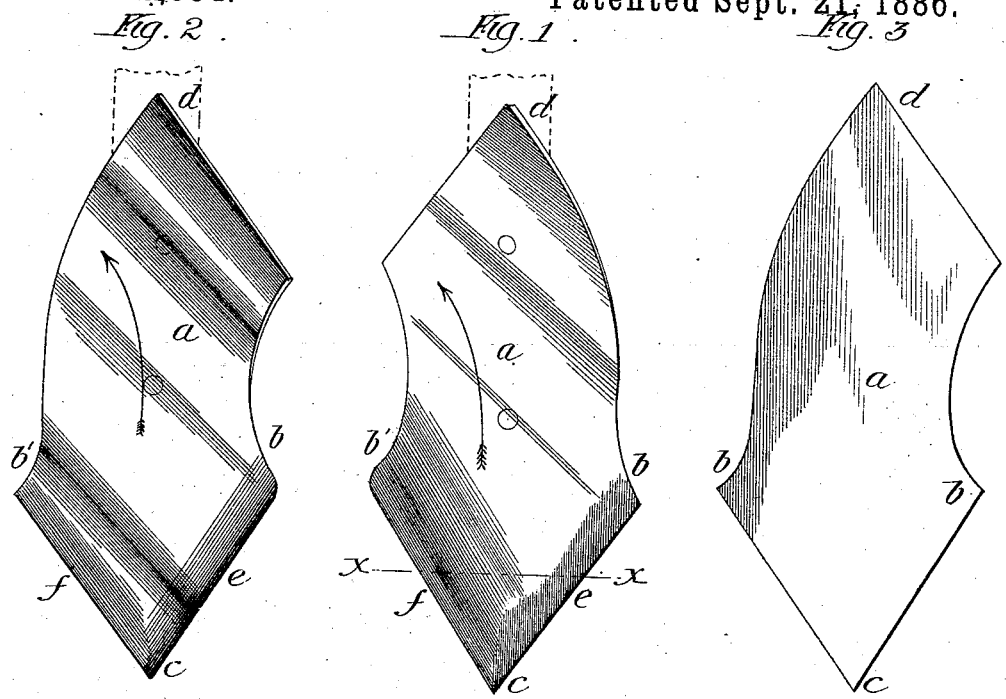
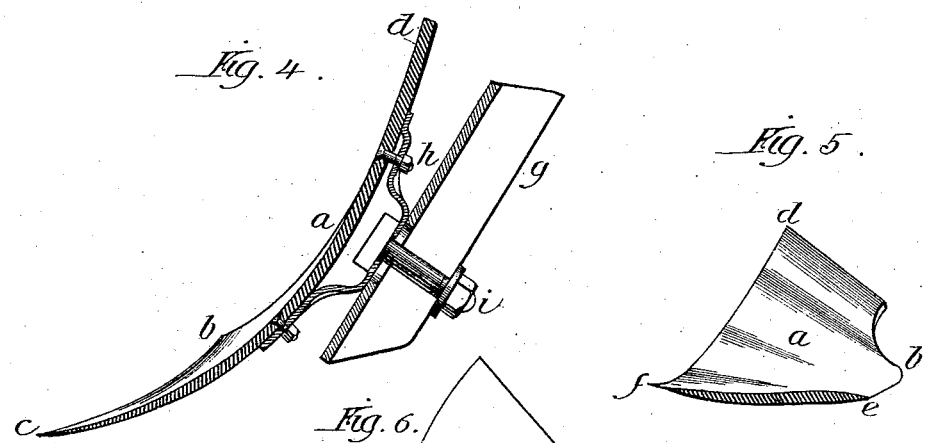
Witnesses:
Marie L. Price
O. W. Bond
Inventor:
John O. Beek
by
West & Bond attys

UNITED STATES PATENT OFFICE.

JOHN O. BEEK, OF PLEASANT PLAINS, ILLINOIS.

CULTIVATOR-SHOVEL.

SPECIFICATION forming part of Letters Patent No. 349,334, dated September 21, 1886.

Application filed May 25, 1886. Serial No. 203,185. (No model.)

*To all whom it may concern:*

Be it known that I, JOHN O. BEEK, residing at Pleasant Plains, in the county of Sangamon and State of Illinois, and a citizen of the United States, have invented a new and useful Improvement in Cultivator-Shovels, of which the following is a full description, reference being had to the accompanying drawings, in which—

Figures 1 and 2 are front views; Fig. 3, a plan view of the blank after it has been cut and forged; Fig. 4, a longitudinal section, showing one method of attachment to the lower end of a shovel-standard; Fig. 5, a cross-section on line $xx$ of Fig. 1, the shovel-blade lying on its back; Fig. 6, outline of the shovel-blank.

The object of this invention is to provide a cultivator-shovel which can be drawn along in the earth without a tendency to lateral or side movements, and which will at the same time invert, or partly invert, the soil lifted by it; and its nature consists in forming a shovel, as hereinafter described, and claimed as new.

In the drawings, $a$ indicates the body of the shovel; $b$, the shoulders or ears; $c$, the point; $d$, an upper point; $e f$, cutting-edges; $g$, sectional lower end of an iron shovel-standard; $h$, back plate for attaching the shovel to a standard; and $i$, bolt.

The blank $a$ or body of the shovel is originally cut or formed in the shape shown at Fig. 6. The cutting-edges $ef$ are mainly formed by hammering, which spreads the blank and produces the shoulders $b$, as shown in Fig. 3. The cutting-edge $e$ is formed by hammering down the upper or face side of the shovel, while the cutting-edge $f$ is formed by hammering the under side, which forming tends to carry the cutting-edge $f$ up and to recede or slightly turn back the cutting-edge $e$. The blank, when its cutting-edges are drawn or hammered, is placed in a suitable mold or die, which gives the shovel the form shown in Fig. 1 when laid in the mold upon one side, or the form shown in Fig. 2 when the blank is laid in the mold the other side up.

The lengthwise curve of the shovel is shown in Fig. 4, while in cross-section the form varies from a convex at the point to a concave at the upper end or side. Along the part where the line $xx$ is taken, the shovel is flat about two-thirds of the distance across, while for the remaining distance it is quite strongly convex, as shown in Fig. 5.

The forms of shovels shown in Figs. 1 and 2 are both right-handed shovels—that is, shovels which will turn the soil from left to right when in use. The form shown in Fig. 3, if curved in the opposite direction, or placed in the former the reverse side up, would be a left-hand shovel; but as here shown it is also a right-hand shovel, no left being shown, it being understood, however, that in the application of these shovels to cultivators they are to be made in right and left pairs, so as to throw the soil toward the row of plants when in one position, and to throw it away from the rows when they are changed or reversed in position, as is common in wheel-cultivators.

The cutting-edge $e$, which is the cutting-edge opposed to the delivery side of the shovel, is rounded backward, as shown, so as to present itself when in use to the soil at nearly a right-angle to the line of movement, while the cutting-edge $f$, being formed by hammering from the under side, presents itself to the soil in such manner as to penetrate and pass through it more easily than the cutting-edge $e$; and by this arrangement the cutting-edge $e$ is made to counterbalance the tendency of the shovel to move out of line by reason of the additional weight and friction caused by the delivery of the soil at the opposite side of the shovel, so that the shovel will pass through the earth without tending to move away from its delivery side, as would be the case if the cutting-edges $e$ and $f$ were formed alike or offered a like resistance to the soil.

The line of movement of the soil passing over the shovels is indicated by the arrows; and from this it will be seen that the shovels have a mold-board effect, and somewhat of a mold-board contour, by which the soil lifted by the shovel is inverted, or partly inverted, according as more or less curve is given to the upper end of the shovel; and it will also be seen that the shovels may be formed from the same blanks, so that the earth will pass off at the end or at the rounded side, according to the way the shovel is bent by the forming mold or die, and that this mold-board effect of lifting and turning the soil is produced without tending to move the shovel out of line and away from the side upon which it is turning, without the use of a landside or other appliance ordinarily resorted to to overcome such tendency, the reverse curvature of the cutting-edge $e$ being sufficient for this purpose. This method of forming a shovel brings the points $c\ d$ substantially in line with the standard, so that the point $d$ protects the standard from abrasion or wear, which is particularly desirable when the standards are made of wood.

When the shovels are in position for use, the cutting-edges $f$ approach a horizontal, and the cutting-edges $e$ a vertical, line, so that the soil passes off over the lower or short corner, $b'$, and this position gives the edge $f$ a receding cut, and the curve gives the edge $e$ a lifting draw-cut, so that the shovel runs more easily through the ground than the ordinary shovel.

I am aware of patents to Gaines, No. 146,524, dated January 20, 1874; Owen, No. 194,531, dated August 28, 1877; Tolley, No. 210,884, dated December 17, 1878, and Dryden, No. 110,836, dated January 10, 1871, and do not claim, broadly, anything therein shown.

What I claim as new, and desire to secure by Letters Patent, is—

The herein-described cultivator-shovel, having its body formed with a mold-board curve and its point, convex at its extremity, and gradually approaching a concave at its upper end, and having cutting-edges $e\ f$, arranged nearly on horizontal and vertical lines and reversely inclined or turned, the shovel being concave in the direction of its length, the construction being such that the soil is discharged over the short corner, and the lateral or sidewise resistance offered by the mold-board is compensated for by the different resistences of the cutting-edges, substantially as described.

JOHN O. BEEK.

Witnesses:
A. L. LISTON,
JAMES W. BEEKMAN.